G. M. Pullman.
Sleeping Car.
No. 2,862. Reissued Feb. 11. 1868.
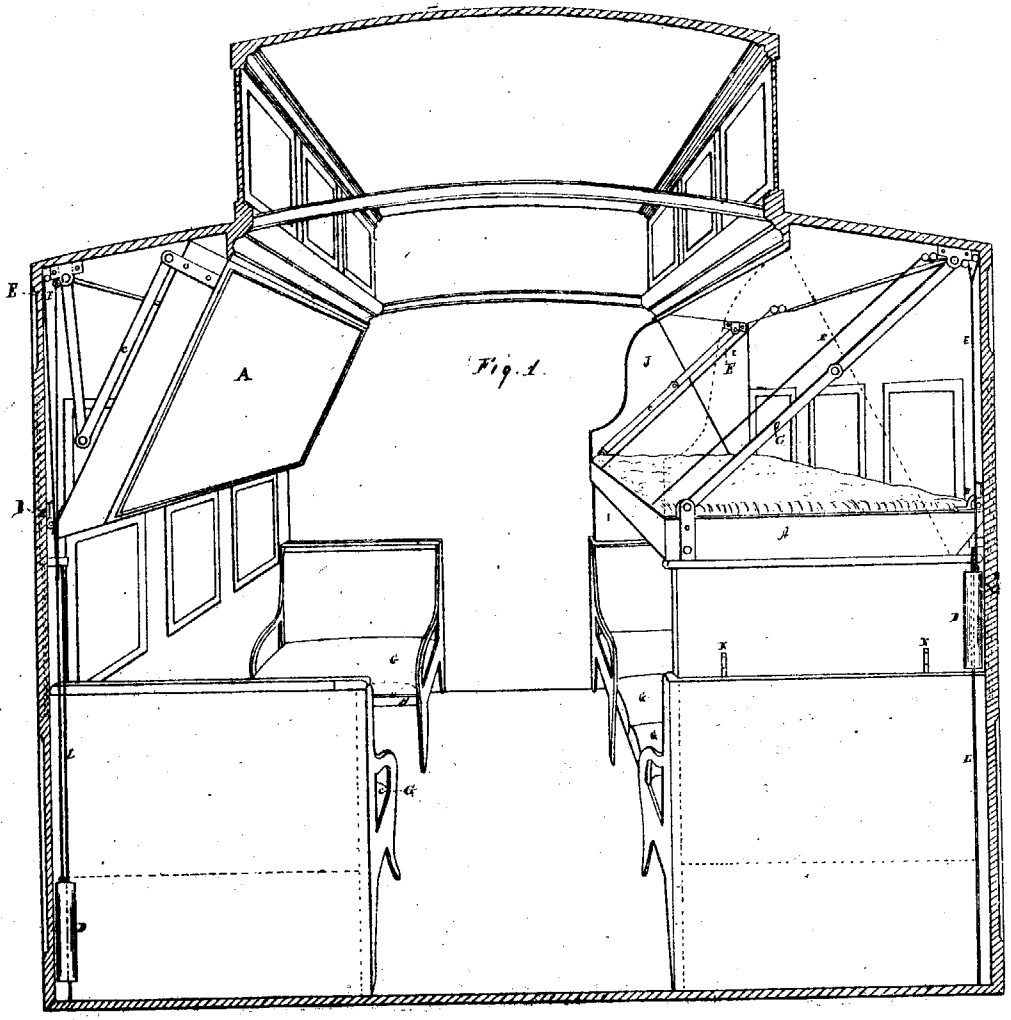
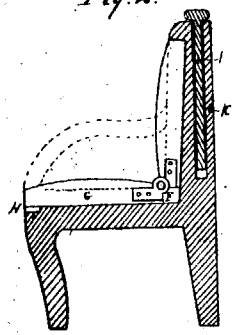
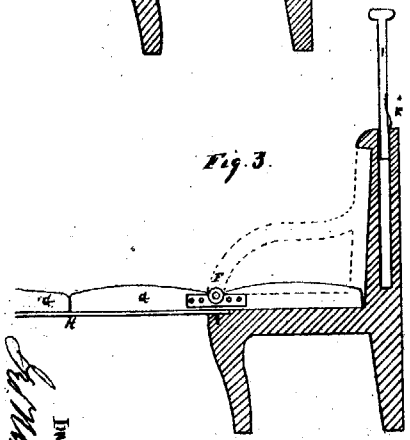
Witnesses
[illegible]
[illegible]
A. H. Bates
W. C. Doane
Inventor
G. M. Pullman

UNITED STATES PATENT OFFICE.

GEORGE M. PULLMAN, OF CHICAGO, ILLINOIS, FOR HIMSELF AND ASSIGNEE OF BEN FIELD, OF ALBION, NEW YORK.

IMPROVEMENT IN SLEEPING-CARS.

Specification forming part of Letters Patent No. 49,992, dated September 19, 1865; Reissue No. 2,862, dated February 11, 1868.

*To all whom it may concern:*

Be it known that BEN FIELD, formerly of Albion, Orleans county, and State of New York, and GEORGE M. PULLMAN, of Chicago, county of Cook, and State of Illinois, did invent certain new and useful Improvements in Sleeping-Cars for Railroads, (for which Letters Patent were granted September 19, 1865, which said invention, with the Letters Patent intended to secure the same, has, by legal assignment dated September 23, 1867, now become the exclusive property of me, the said GEORGE M. PULLMAN;) and I do hereby declare that the following is a full, clear, and exact description of the same, reference being had to the annexed drawings, making part of this specification, in which—

Figure 1 is a perspective interior view of a section of the car containing one set of berths on each side of the car, one side being represented in the form for use as a day-car and the other side as a sleeping-car. Fig. 2 is a cross-section of one of the chairs as used for a day-car, and Fig. 3 is a cross-section of one of the chairs as used for forming a sleeping-couch.

This invention relates to the method of constructing the seats and berths of sleeping-cars so that they may be more readily and conveniently changed from the condition of a day-car to a sleeping-car, and vice versa, than by the modes of construction before used.

The first part of this invention relates to the construction of the upper berth of the car; and it consists in constructing the berth with a rigid frame or platform of the proper form to receive the bedding, which is permanently attached to the side of the car by fixed hinges, and when not in use is swung up in a diagonal position into a recess formed to receive it in the upper part of the car, the bottom of the berth fitting closely to the car and forming a door to it and an ornamental ceiling for that part of the car, thus inclosing a space between the berth and side of the car, in which all the bedding in that compartment can be placed when not in use, and entirely secreted and protected from the dust; and it also consists in the employment, in combination with a berth thus constructed, of a counterpoise, so arranged as to aid in turning up the same, so that the berth and its contents may be more easily handled, with other peculiarities of construction in connection therewith that will be hereinafter described.

This invention relates, in the second place, to the manner of constructing and arranging the seats of the car so that the cushions of the same may be readily converted into lower berths, as will be hereinafter described.

A A are the upper berths, each formed of a rigid platform or frame, and provided with a suitable inclosure for the bedding, and are made by preference about as wide as the length of the seats, as is shown. They are each permanently connected with the side of the car by strong hinges at B, at a suitable height above the seat, which support that side of the berth, the opposite side being supported, when it is used, by the jointed suspenders C, which have a pin-joint at each end and near the middle to enable them to fold together when the berth is turned up, as shown, one end of each suspender being attached to the front edge of the berth and the other end to the roof near the upper corner of the car by suitable joint-pieces.

When the car is used as a day-car the front edge of the berth A is raised up to an angular position until the front side of it nearly touches the roof of the car, and is held there by a spring-catch or other suitable fastening, in which position it is entirely out of the way, and the mattresses and bedding and other accessories of both the upper and lower berths are shut out of sight into the triangular recess in the upper corner of the car.

The upper berths, when made broad, as is shown, with the bedding and other furniture of one section of the car placed upon them, have considerable weight, and to enable them to be easily handled they are counterbalanced by means of weights D, running on rods L, to steady them, and the cords E, working over suitable pulleys and attached to the front side of the berth, so that the berths move easily up and down by hand. The weights D upon either side of the car may be inclosed in a closet in the center of the car, and wire rope or other cords lead over pulleys from them to each berth. If the upper berths are made somewhat narrower, they may be so arranged as to throw them back against the side of the car into a perpendicular position, the recess to receive them being in that case formed on the side of the car.

M represents one of the series of triangular partitions placed between the berths, extending from the upper berth to the roof of the car, and inwardly in a diagonal direction to the cornice N, which is usually placed just below the sides of the ventilating-chamber in cars that are thus constructed, as is shown in the drawings. The partitions M and cornice N form a series of recesses, which receive the berths A when they are turned up. The lower surface of the berth is finished in some appropriate ornamental style, and fits closely to the partition M and cornice N, forming a neat and handsome inclined ceiling to the upper part of the car and an inclosure in which the bedding and other furniture of the berths can be secured and carried secure from the dust.

The chairs or seats are arranged in pairs facing each other, as shown, and at a sufficient distance apart to give length for a berth between the frames of the backs. The cushions forming the back and seat of each chair are made separate from the seat-frames and hinged together at F. When the lower couch has to be made up for sleeping the seat-cushions G are drawn forward until the cushion G′, forming the back, lies horizontally on the seat-frames, the cushions G meeting together, and one end resting on the bar H, which turns on a hinge from one of the seats or chairs, as shown in the drawings. The other ends of the cushions G are supported by resting on a cleat of wood fastened to the side of the car. A continuous horizontal couch is thus formed by the four cushions, upon which such bedding may be placed as is desired.

The back of the chairs may be made double, so as to receive a sliding partition, I, which sinks between the backs when the car is used as a day-car, and is drawn up against the bottom of the upper berth when used as a sleeping-car, and is held up by the spring-catches K, thus affording an additional support to the upper berth.

J is a movable head-board, which is slipped in when the berth is made up to fill up the space at each end of the berth between the sliding partitions I when it is raised up and the partition M. It is held in place by hasps or other suitable attachments which will allow it to be readily removed and placed upon the upper berth with the bedding and inclosed in the triangular space above the berth when it is turned up.

I do not claim as a part of this invention the use of sliding head-boards; but

What is claimed as the invention of the said FIELD and PULLMAN is—

1. The construction and arrangement of the berth A, hinged to the car at B, and supported by the jointed suspenders C, or other analogous devices, the whole so adapted to the car that it forms a recess to receive the same when turned up, substantially as described.

2. In combination with the berth A, the sliding partition I, substantially as described.

3. In combination with the berth A, the movable head-board J, substantially as described.

4. The construction and arrangement of a car-seat with the back and seat cushions hinged together and disconnected from the seat-frame, so that the back-cushion may be placed on the seat-frame and the seat-cushion extended to meet the seat-cushion of the opposite chair, substantially as described.

Executed November 15, 1867.

GEO. M. PULLMAN.

Witnesses:

CALVIN D. WOLF,
P. H. WISE.